(12) United States Patent
Leung

(10) Patent No.: US 8,347,815 B2
(45) Date of Patent: *Jan. 8, 2013

(54) MOBILE PET BED/CARRIER

(76) Inventor: Michael Leung, Pomona, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/360,749

(22) Filed: Jan. 29, 2012

(65) Prior Publication Data

US 2012/0125265 A1 May 24, 2012

Related U.S. Application Data

(63) Continuation of application No. 12/799,669, filed on Apr. 29, 2010, now Pat. No. 8,127,715, which is a continuation of application No. 11/522,719, filed on Sep. 18, 2006, now Pat. No. 7,712,437.

(51) Int. Cl.
*A01K 1/015* (2006.01)

(52) U.S. Cl. .................. 119/28.5; 119/482; 119/497

(58) Field of Classification Search .............. 119/28.5, 119/452, 453, 482, 487, 483, 496, 165, 751; D30/109, 117, 118

See application file for complete search history.

(56) References Cited

U.S. PATENT DOCUMENTS

| | | | | |
|---|---|---|---|---|
| 236,812 A * | 1/1881 | Higgins | ....................... | 217/124 |
| 692,501 A * | 2/1902 | Bentley | ............................. | 5/416 |
| 1,041,167 A * | 10/1912 | Rogers | ........................... | 119/482 |
| 1,143,774 A * | 6/1915 | Nichols | ...................... | 135/88.02 |
| 1,289,965 A * | 12/1918 | Tichenor | .................. | 296/107.02 |
| 1,412,935 A * | 4/1922 | Greenebaum | ..................... | 5/416 |
| 2,032,248 A * | 2/1936 | Bins | ............................... | 119/482 |
| 2,080,786 A * | 5/1937 | Robles | ........................ | 220/252 |
| 2,543,300 A * | 2/1951 | Ptak | ............................... | 217/124 |
| 2,790,414 A * | 4/1957 | Rossow | ........................ | 119/497 |
| 2,811,977 A * | 11/1957 | McClish | .................. | 297/184.14 |
| 3,067,039 A * | 12/1962 | Crane | ........................... | 426/106 |
| 3,524,431 A * | 8/1970 | Graham et al. | ............... | 119/496 |
| 3,834,352 A * | 9/1974 | Gervis | .......................... | 119/453 |
| 4,320,849 A * | 3/1982 | Yellin | ........................... | 220/252 |
| 4,539,935 A * | 9/1985 | Meyer | .......................... | 119/28.5 |
| D294,985 S * | 3/1988 | Blieden | ........................ | D30/109 |
| D295,276 S * | 4/1988 | Brown et al. | ................. | D12/128 |
| 4,825,484 A * | 5/1989 | Riegel | ................................ | 5/97 |
| 4,886,083 A * | 12/1989 | Gamache | ................... | 135/88.06 |
| 4,978,166 A * | 12/1990 | James | ...................... | 297/184.17 |
| 4,989,744 A * | 2/1991 | Tominaga | ..................... | 220/835 |
| 5,005,234 A * | 4/1991 | Kelleher et al. | ..................... | 5/94 |
| D333,537 S * | 2/1993 | Muse, Jr. | ...................... | D30/114 |
| 5,220,884 A * | 6/1993 | Townsend | ..................... | 119/496 |
| 5,277,148 A * | 1/1994 | Rossignol et al. | ............ | 119/453 |
| 5,282,439 A * | 2/1994 | Oaks | .............................. | 119/482 |
| 5,307,758 A * | 5/1994 | Ho | ................................ | 119/497 |
| 5,311,837 A * | 5/1994 | Mamer-Boellstorff | ....... | 119/28.5 |
| 5,320,405 A * | 6/1994 | Foster et al. | ............. | 297/184.17 |

(Continued)

*Primary Examiner* — Yvonne Abbott

(74) *Attorney, Agent, or Firm* — David J. Willon

(57) ABSTRACT

The present invention relates to a mobile pet bed wherein the top and bottom units of the mobile pet bed are reversibly attached to each other. When the top unit is removed from the bottom unit the mobile pet bed functions similarly to a traditional pet bed. When the top unit is attached to the bottom unit the mobile pet bed functions as a pet carrier. Additionally, the top unit of the mobile pet bed has a door portion that can be opened and closed to permit pet ingress and egress as well as permitting easy loading of the mobile pet bed with the animal without necessitating the removal of the top unit from the bottom unit.

16 Claims, 3 Drawing Sheets

U.S. PATENT DOCUMENTS

| | | | |
|---|---|---|---|
| 5,542,560 A * | 8/1996 | Gerster et al. | 220/252 |
| 5,740,826 A * | 4/1998 | Nevin et al. | 135/88.06 |
| 5,740,828 A * | 4/1998 | Evans | 135/132 |
| 5,819,974 A * | 10/1998 | Caldwell | 220/326 |
| 5,887,436 A * | 3/1999 | Duddleston | 62/3.62 |
| 5,901,664 A * | 5/1999 | McKernan | 119/453 |
| D413,004 S * | 8/1999 | Decarlo-Williams | D30/109 |
| 5,944,213 A * | 8/1999 | Alicea et al. | 220/287 |
| 6,047,573 A * | 4/2000 | Martinez | 70/58 |
| 6,196,161 B1 * | 3/2001 | Thurber | 119/496 |
| 6,209,611 B1 * | 4/2001 | Johnson | 160/84.01 |
| D445,966 S * | 7/2001 | Licciardello | D30/109 |
| D451,646 S * | 12/2001 | Lerner | D30/109 |
| D453,593 S * | 2/2002 | Licciardello | D30/109 |
| 6,382,451 B1 * | 5/2002 | Di Filippo et al. | 220/324 |
| 6,431,393 B1 * | 8/2002 | Stewart | 220/826 |
| 6,502,594 B1 * | 1/2003 | Gerstmar | 135/120.1 |
| D469,929 S * | 2/2003 | Licciardello | D30/109 |
| 6,517,153 B1 * | 2/2003 | Brewer | 297/184.13 |
| D475,660 S * | 6/2003 | Licciardello | D12/129 |
| 6,584,937 B1 * | 7/2003 | Ludolph | 119/453 |
| 6,892,897 B2 * | 5/2005 | Stewart | 220/252 |
| 6,899,057 B1 * | 5/2005 | Chrisco et al. | 119/498 |
| 6,907,842 B2 * | 6/2005 | Godshaw | 119/28.5 |
| 7,051,481 B2 * | 5/2006 | Delavega et al. | 52/66 |
| D524,996 S * | 7/2006 | Delino | D30/109 |
| 7,117,879 B1 * | 10/2006 | Massey | 135/132 |
| 7,174,584 B2 * | 2/2007 | Danaher | 5/414 |
| 7,261,060 B1 * | 8/2007 | Garofola et al. | 119/496 |
| 7,270,084 B2 * | 9/2007 | Van Fleet, Jr. | 119/496 |
| 7,311,355 B2 * | 12/2007 | Fargason, III | 297/184.15 |
| 7,427,101 B1 * | 9/2008 | Zernov | 297/184.14 |
| 7,712,437 B2 * | 5/2010 | Leung | 119/28.5 |
| 7,856,945 B2 * | 12/2010 | Matsuo et al. | 119/166 |
| 2001/0029901 A1 * | 10/2001 | Hoagland | 119/497 |
| 2002/0112674 A1 * | 8/2002 | Lerner | 119/497 |
| 2005/0146125 A1 * | 7/2005 | Wheeler | 280/789 |
| 2005/0194028 A1 * | 9/2005 | Shinner et al. | 135/90 |
| 2006/0037553 A1 * | 2/2006 | Miller et al. | 119/497 |
| 2006/0213452 A1 * | 9/2006 | King | 119/496 |
| 2007/0006910 A1 * | 1/2007 | Chu et al. | 135/133 |

* cited by examiner

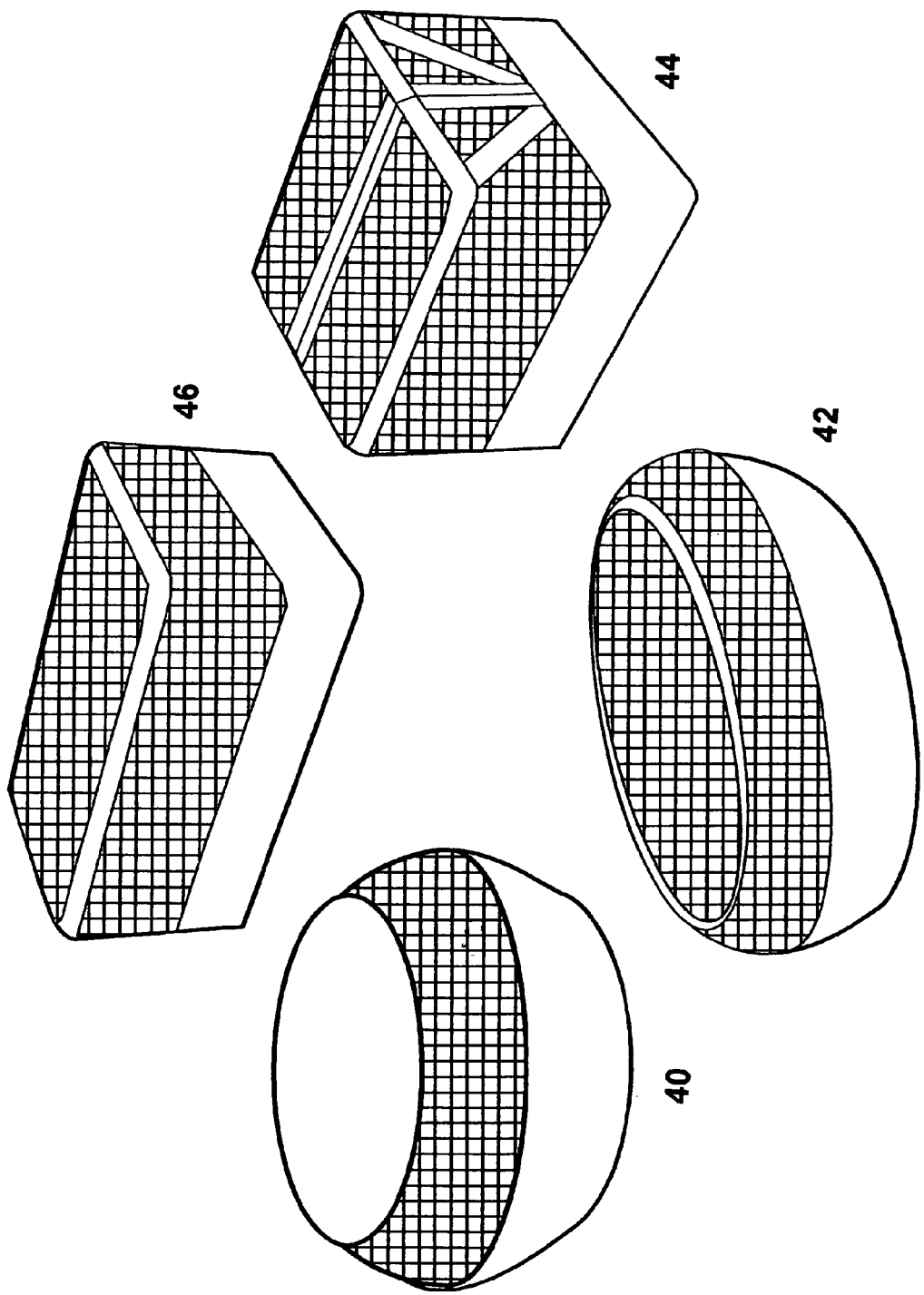

MOBILE PET BED/CARRIER

This application is a Continuation application of USPTO application Ser. No. 12/799,669, filed Apr. 29, 2010, now U.S. Pat. No. 8,127,715 which is a Continuation application of USPTO application Ser. No. 11/522,719, filed Sep. 18, 2006, now U.S. Pat. No. 7,712,437, both herein incorporated by reference.

FIELD OF THE INVENTION

The invention relates generally to a device designed for the comfort of a pet or other animal both at home and during travel.

BACKGROUND OF INVENTION

Generally, people want to make their pets or animal companions as comfortable as reasonably possible. In this regard, pet owners often provide "safe places," i.e., familiar, comfortable places, for their pets to retire to when tired or scared. These "safe places" may take the form of, for example, a favorite corner of a room, a doghouse or a pet bed. Pet beds are popular among pet owners. In fact, pet bed displays frequently take up large display areas in pet shops and pet supply stores. That retail establishments devote so much space to pet beds is indicative of their popularity among pet owners.

Often times pet owners travel with their pets. Prior art methods of traveling with pets, especially when using public modes of transportation (e.g., planes, trains or buses), require that the animal be contained for the safety of both the animal and other passengers. Likewise, when traveling by private vehicle (e.g., car, private plane), pet owners often contain their pet for the pet's protection in the event of an accident and/or to prevent the pet from becoming a nuisance to the driver and passengers. Prior art devices for the containment of a pet during travel (e.g., pet crates and cages) typically consist of hard plastic boxes with ventilation holes and a door. Other examples of pet containment devices found in the prior art are wire cages with, sometimes, a hard plastic base. Cushions are available to place in the crate or cage for the comfort of the animal. For smaller animals (i.e., small dogs and cats) soft-sided devices resembling shoulder bags are available.

The problem with prior art devices for traveling with animals is that the animal tends to be unfamiliar with the device (i.e., the pet carrier) or associates the device with unfavorable or even frightening events such as being locked in the baggage compartment of a public transportation vehicle or traveling to the veterinarian's office. Therefore, what is needed is a device for containing and traveling with an animal that the animal associates with pleasurable, safe, secure activities and events so that, when travelling, the animal can have a level of familiarity and comfort not associated with currently available pet carrier devices.

SUMMARY OF INVENTION

In one aspect, the invention relates to a device that can function as both a pet bed and a pet carrier by being converted from one to the other and back and will be referred to here as a mobile pet bed. In this regard, the mobile pet bed, when functioning as a pet bed, becomes a familiar, safe and secure place for the pet. In other words, the pet associates the device with positive, pleasurable events. The pet wants to go to his/her "safe place" when feeling scared, stressed or just to relax and sleep. Since the mobile pet bed is a familiar place for the pet, when used as a pet carrier, the pet will be traveling in the same safe, secure and familiar place thereby helping to relieving the stress, anxiety and discomfort associated with traditional pet carrier devices.

In one embodiment, the mobile pet bed is a pet bed comprising a shell and, optionally, a liner. The pet bed is the bottom unit of the device. The bottom unit can be reversibly attached to the top unit of the device. The top unit, in one embodiment, comprises, for example, a frame or other support means, a flexible material covering the frame, a means for opening a portion of the top unit to provide a door for the pet without necessitating the removal of the top unit from the bottom unit. One embodiment of the frame of the top unit comprises, for example, a lower frame member delineating the bottom of the top unit, a plurality of upper frame members pivotally attached to said lower frame member such that said top unit can be opened by pivoting said upper frame members towards said lower frame member and closed by pivoting said upper frame members away from said lower frame member. Additionally, for example, the top unit may be covered in a flexible material, the flexible material, for example, being secured to said lower frame member and said upper frame members, covering the space created between said lower frame member and said upper frame members and permitting air circulation into and out of said pet bed.

Optionally, the top unit also comprises a handle or handles and attachment point(s) for a shoulder strap or pull handle. Handles and shoulder straps are useful for conveying the mobile pet bed. In a preferred embodiment, the flexible material of the top unit permits air exchange into and out of the mobile pet bed for the comfort of the animal.

The top unit of the mobile pet bed of the present invention is, in one embodiment, at least about 10% the height of the bottom unit. In another embodiment it is at least about 25%, 50% or 75% the height of the bottom unit, thereby allowing the top unit to extend above the top of the bottom unit. The advantage of having the top unit extend above the top of the bottom unit is to aid in animal ingress and egress and to aid in loading the mobile pet bed with the animal through the door of the mobile pet bed. Such a design also greatly increases interior space for greater animal comfort while allowing the bottom unit to be low enough for animals to enter and exit easily.

The mobile pet bed of the present invention is not limited to any particular shape. Any shape is contemplated for the device of the present invention. For example, the mobile pet bed could be circular, oval, square, rectangular, trapezoidal, etc. In a preferred embodiment, the mobile pet bed is circular in shape.

The mobile pet bed of the present invention is not limited by the means of reversibly attaching the bottom unit to the top unit of the device. For example, such attachment means may comprise one or more zippers, buttons, hook and loop fasteners, snaps, hooks, buckles, laces, straps, etc. In a preferred embodiment, the attachment means is by one or more zippers.

The mobile pet bed of the present invention is not limited by the type, position or size of door present on the top unit so long as the door permits the egress and ingress of the pet without removing the entire top unit from the bottom unit. When opened, the door of the top unit may, for example, result in 20-75%, 25-60% or 30-50% of the top unit being opened. In a preferred embodiment, the door of the top unit of the present invention opens enough to permit the ingress and egress of an animal.

The door, doorway or opening of the top unit of the mobile pet bed of the present invention is not limited to any particular type of door, doorway or opening. For example, the door may be a panel secured with, for example, one or more zippers, buttons, snaps, hook and loop fastener, hooks, buckles, laces straps, etc. In another embodiment, the door may comprise sections or portions of the top unit that fold or rotate to provide an opening for the door of the present invention. In a preferred embodiment, the door of the mobile pet bed of the present invention comprises a portion of the top unit that rotates or folds to provide the door wherein the door is secured when closed with one or more zippers. This design of having a top unit comprising a door allows use of the bed with the top unit on or off. For example, some pets feel secure with the top on and with the door open for entry and exit. When the door is closed the mobile pet bed of the present invention is a secure carrier that is familiar to the pet. Additionally the owner can also remove the top unit off at home so it looks more like a traditional pet bed.

In yet another embodiment of the present invention, it is contemplated that the mobile pet bed comprises a bottom unit and a top unit that can be reversibly attached to each other; the bottom unit comprising a base and sides, said base and sides being essentially rigid; the top unit comprising a flexible material that may be partially or fully moved, removed or folded back (for example, by use of a flap, slide, accordion pleat, roll-up, tie-back, pieces that compress and etc.) to create an opening in the top unit large enough to permit the ingress and egress of an animal and wherein said top unit permits air circulation into and out of the pet carrier and wherein said top unit is at least 50% the height of the bottom unit. In another embodiment, the top unit is at least 75% the height of the bottom unit. In the context of the present invention, the term "essentially rigid" or "semi-rigid" is defined as being stiff and non-pliable or as being stiff but capable of slight bending or having flexibility (e.g., molded plastic). In the context of the present invention, the term "essentially rigid" or "semi-rigid" is also defined as being self-standing while also being pliable and/or compressible (e.g., high density foam or other foams and foam-like materials meeting this definition).

The mobile pet bed of the present invention is not limited to any particular size. For example, small mobile pet beds may be suitable for use with, for example, small animals such as cats, kittens, puppies, small dogs and other small animals (e.g., skunks, hamsters, guinea pigs, etc.). Medium mobile pet beds may be used, for example, with medium sized dogs. Even larger mobile pet beds may be used with, for example, large dogs, small pigs (e.g. pot bellied pigs), etc. Small mobile pet beds of the present invention are approximately 8 inches to 15 inches in diameter or as measured across the shortest horizontal distance. Medium mobile pet beds of the present invention are approximately 15 inches to 24 inches in diameter or diameter or as measured across the shortest horizontal distance. Large mobile pet beds of the present invention are approximately 24 inches to 36 inches in diameter or as measured across the shortest horizontal distance. The actual size of the mobile pet bed of the present invention is not considered a limiting embodiment of the present invention.

For the purposes of this invention, the terms "pet" and "animal" shall be interchangeable and shall refer to any animal that is used with the present invention.

The mobile pet bed of the present invention may also comprise wheels. This may be helpful for transporting animals in the medium and large size mobile pet beds of the present invention. The wheels may be attached to the bottom unit. In one embodiment, the wheels may be permanently attached to the shell of the bottom unit (see, infra). In another embodiment, the wheels may be attached to a base unit wherein the bottom unit of the invention may be placed for transport. In this regard, the base unit would function as a wheeled carrier for the mobile pet bed of the present invention not unlike a carrier for moving, for example, trash barrels. The wheels of the mobile pet bed may be locking or non-locking The base unit may have a means of attachment to the bottom unit but need not have such means of attachment.

In order to facilitate the movement of the embodiments of the mobile pet bed of the present invention comprising wheels, the mobile pet bed may also comprise a pull handle. Such pull handle may attach to the mobile pet bed of the present invention at the top unit, the bottom unit or the base unit or a combination thereof. The pull handle may be flexible (for example, made of a fabric material) or rigid (for example, made of a hard plastic or metal). The flexible pull handle may also retract into the mobile pet bed. The rigid pull handle may also be telescopic.

In the most preferred embodiment, the mobile pet bed of the present invention comprises: 1) a bottom unit comprising a fabric covered rigid or essentially rigid (see, below) plastic shell that gives shape to the product and will protect pet from bumps during travel; 2) a water resistant foam bed and wall liner that will not allow liquids to soak through and wipes clean and the foam will absorb shock and increase comfort; 3) a washable bed cover (for example, made of natural or artificial shearling [sheep skin with wool attached]) wherein the bed cover has, for example, 1 zipper on the top edge and 1 zipper on bottom edge that will keep bedding taught and allow for easy removal for washing (prior art beds do not have this 2 zipper attachment so the bedding slides around); 4) a removable top unit with mesh windows with an optional integrated handle wherein the removable top unit can be used 3 different ways: i) removed so the mobile pet bed is similar to a regular pet bed, ii) attached and closed for taking the pet on a trip, and iii) attached but with the door portion opened so the animal can hide behind mesh, go in and out as they please and the mobile pet bed will be ready to zip up and go when pet is placed inside; 5) an optional removable shoulder strap; and 6) an optional heat pad that fits in between the bed cover and foam bedding. The heating pad may, for example, be powered by a UL approved power adapter for, e.g., home and auto use or it may be powered by rechargeable or non-rechargeable batteries.

The present invention also contemplates that the mobile pet bed of the present invention embodies different non-limiting variations and options. For example, the top unit may be a non-removable top that pushes or folds down into bed for storage. In another embodiment the mobile pet bed is designed so that it can be stacked. This embodiment may be useful for owners of multiple pets, pet shops or business that frequently engage in the transportation of pets and other animals or just for storage. In another embodiment, the mobile pet bed of the present invention comprises one or more seat belt loops or other means for the attachment of a seat belt such as those found in cars and planes. In yet another embodiment, the bottom unit comprises a non-slip base made of, for example, rubber or a rubber-like material. In another embodiment the bottom unit is made from a one-piece molded (uni-molded, see, below) shell (foam, plastic, etc) in which a liner, for example, may be placed. In yet another embodiment, the mobile pet bed portion (i.e., the bottom unit) of the present invention also comprises a removable elevated mesh bed for hot days and/or attachable play sets (such as might entertain a kitten or puppy).

In yet other embodiments, the bottom unit may comprise a plastic shell (e.g., high-density plastic) coupled with foam bedding and/or a liner. The liner may be leak-proof or leak-resistant. The plastic shell may be "rigid" or "essentially rigid" as defined below. The plastic shell of the bottom unit may be made of a single a uni-molded piece of plastic or of two or more separate pieces glued or otherwise attached to each other to form the base unit. The term "uni-mold" and "uni-molded" are defined herein as meaning an item (such as the bottom unit of the present invention) being molded in one piece instead of more two or more pieces that need to be assembled. Although the present invention is not limited to theory, the design of a hard plastic shell lined with a foam liner is thought to protect a pet while traveling. Fabric may cover both the bottom unit and top unit. Fabric may be attached to or adhered to the shell of the base unit and frame (if present) of the top unit by using adhesives, sewing, rivets, plugs, etc. In another embodiment, the shell of the base unit and frame of the top unit are inserted into a fabric covering and sealed closed by glue, buttons, sewing, zippers, etc. Although the present invention is not limited to any particular choice in fabric, 1680D ballistic nylon is preferred for both the bottom unit and top unit for it's durable properties and high tech appearance. Other features and advantages of the invention will be apparent from the following description and are incorporated herein as embodiments of the present invention.

BRIEF DESCRIPTION OF DRAWINGS

FIG. 3 shows various non-limiting shapes of the mobile pet bed of the present invention.

DETAILED DESCRIPTION OF THE PREFERRED EMBODIMENTS

The invention will now be described in detail with reference to a few preferred embodiments, as illustrated in accompanying drawings. In the following description, numerous specific details are set forth in order to provide a thorough understanding of the invention. However, it will be apparent to one skilled in the art that the invention may be practiced without some or all of these specific details. In other instances, well-known features and/or process steps have not been described in detail in order to not unnecessarily obscure the invention. The features and advantages of the invention may be better understood with reference to the drawings and discussions that follow.

While the invention has been described with respect to a limited number of embodiments, those skilled in the art, having benefit of this disclosure, will appreciate that other embodiments can be devised which do not depart from the scope of the invention as disclosed herein.

Figure 1:
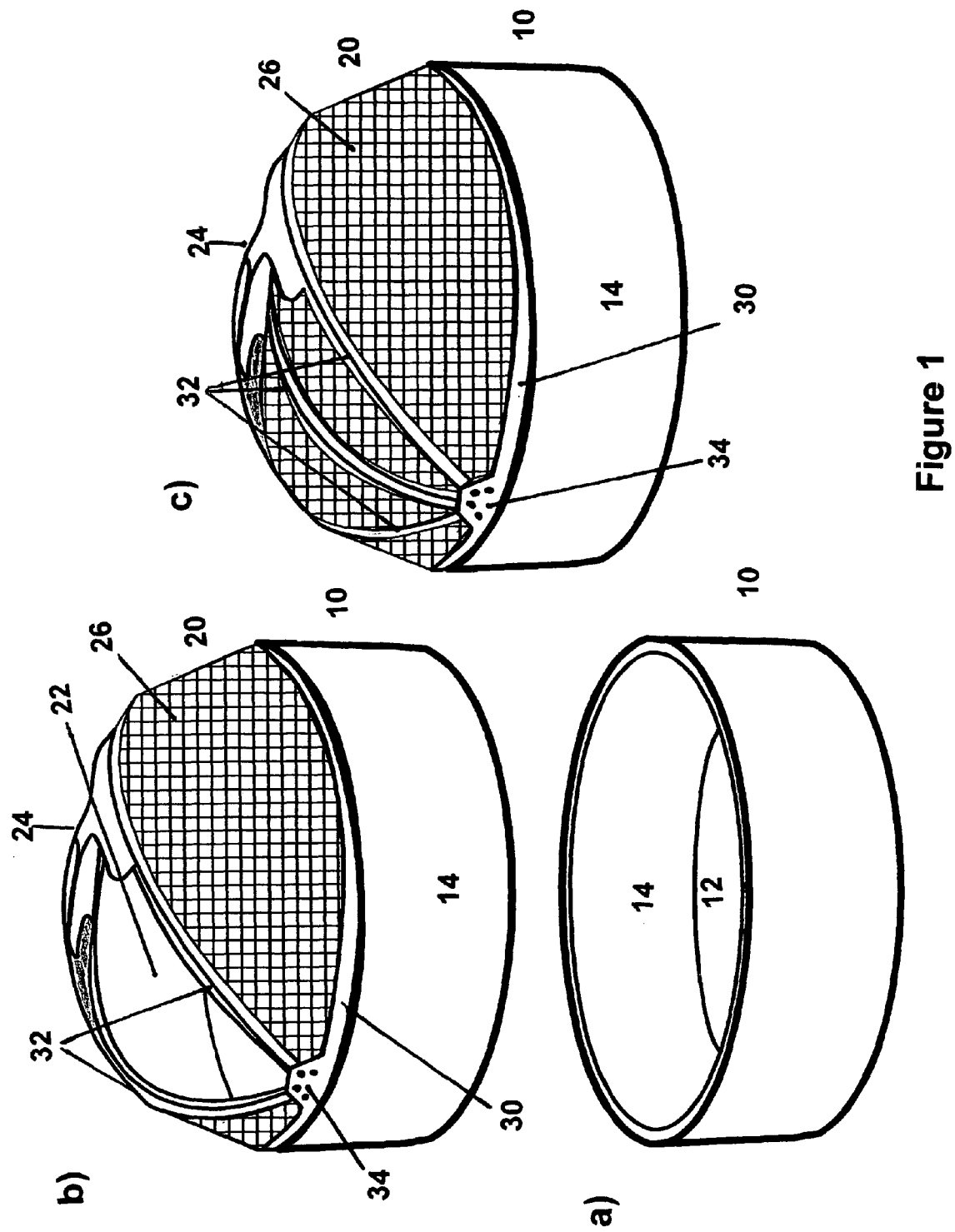
FIG. 1(A-C) shows (A) one embodiment of the bottom unit of the mobile pet bed of the present invention. (B) one embodiment of the mobile pet bed of the present invention with the reversibly removable top unit attached to the bottom unit with the door portion of the top unit in the opened position and (C) the mobile pet bed of the present invention with the top unit attached to the bottom unit with the door of the top unit in the closed position.

Referring now to FIG. 1A, the bottom unit (10) is shown having a base (12) and sides (14). In the present invention, the word side or sides do not limit the invention to any actually number of sides or any particular shape. For example, the sides may be flat or curved. The sides will determine the shape of the mobile pet bed of the present invention. For example, curved sides would provide for a circular (e.g., round, oval or elliptical) shaped mobile pet bed. Flat sides would provide for, e.g., a square or rectangular mobile pet bed.

Referring now to FIG. 1B, the top unit (20) is shown reversibly attached to the bottom unit. The top unit (20) is also shown with the door portion (22) of the top unit in the opened position. As illustrated in FIGS. 1B and 1C, in this non-limiting embodiment of the present invention, the handle (24) is comprised of two elongated tabs that reversibly attach to each other (e.g., with hook and loop fastener, buttons, snaps, etc.) to form a handle for carrying the mobile pet bed and using it as a pet carrier. In other embodiments, the handle is attached differently by ways known in the art. Also shown in FIG. 1B is the flexible material (26) that covers the top unit. As can be seen in FIGS. 1B and 1C, the flexible material is porous (e.g., a mesh material) to allow for the exchange of air into and out of the mobile pet bed.

Continuing with FIGS. 1B and 1C, in this embodiment of the present invention the top unit is comprised of a circular frame member (30) and a plurality of semi-circular frame members (32) pivotally attached to the circular frame member (30) at pivot points (34). In this embodiment of the present invention, the top door is opened and closed by pivoting two or more of the semi-circular frame members (32) towards the circular frame member (30) to open the door as is shown in FIG. 1B and away from the circular frame member (30) to close the door as is shown in FIG. 1C. In one embodiment, the semi-circular frame members attach to the circular bottom frame member at separate pivot points. In another embodiment, two or more semi-circular frame members attach to the circular bottom frame member at the same pivot point (not shown).

Figure 2:
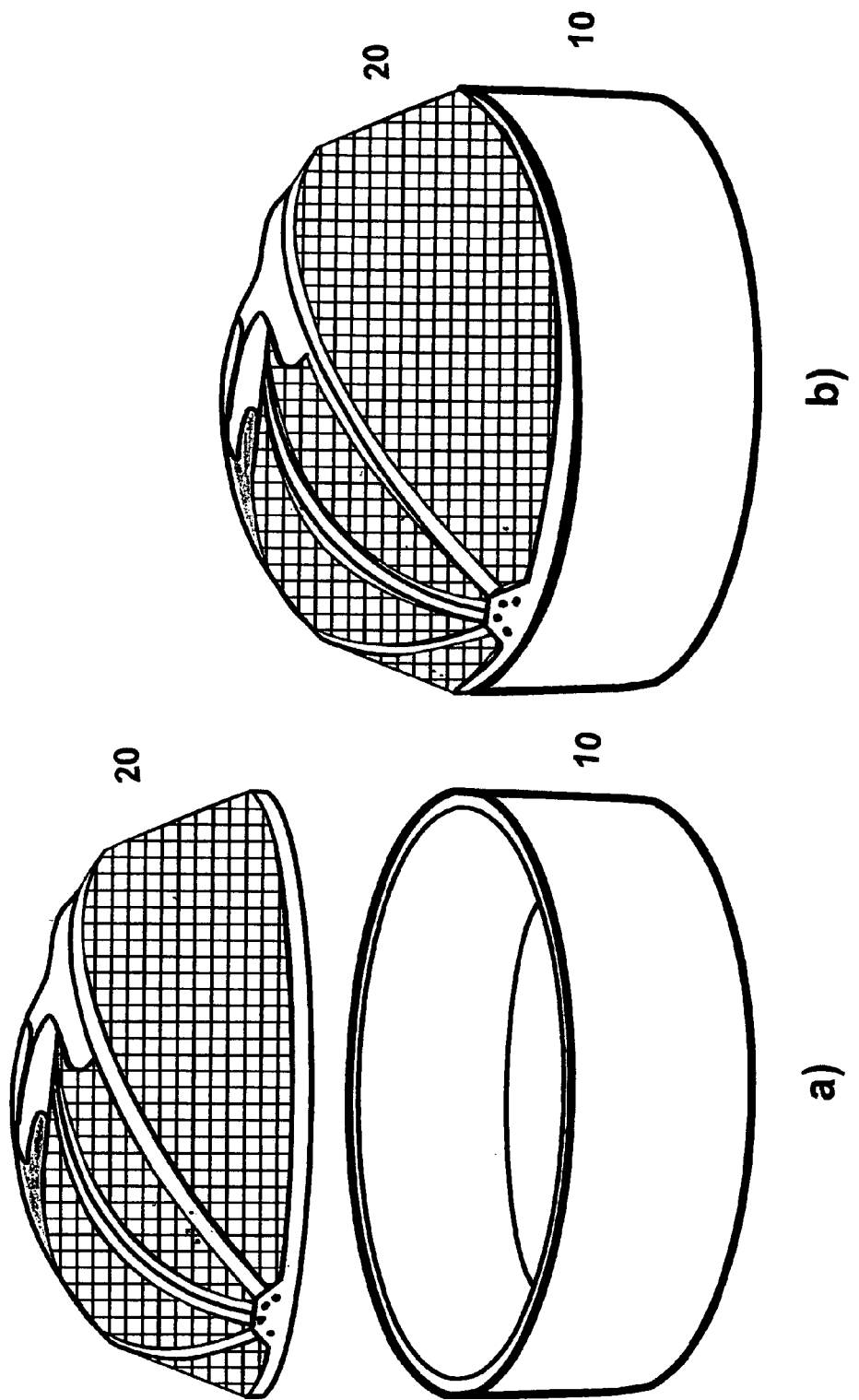
FIG. 2(A-B) shows (A) the mobile pet bed of the present invention with the reversibly removable top unit removed from the bottom unit and (B) the mobile pet bed of the present invention with the reversibly removable top unit attached to the bottom unit.

Moving now to FIGS. 2A and 2B, in this embodiment of the present invention, the mobile pet bed is shown with the reversibly attached top unit (20) removed and attached from the bottom unit (10), respectively.

FIG. 3 illustrates different non-limiting shapes of the present invention. Shown are circular (40), elliptical (42), square (44) and rectangular (46).

What is claimed is:

1. A pet bed that may be converted to a pet carrier for the transport of an animal, said pet bed comprising:
    a. a bottom unit and a top unit that can be reversibly attached to each other;
    b. said bottom unit comprising a base and sides;
    c. said top unit comprising a lower frame member delineating the bottom of the top unit, a plurality of upper frame members attached to said lower frame member with flexible material, and such that said top unit can be opened by moving said upper frame members towards said lower frame member and closed by moving said upper frame members away from said lower frame member, wherein said top unit is covered in a flexible material, said flexible material being secured to said lower frame member and said upper frame members.

2. The pet bed of claim 1, wherein said bottom unit comprises a uni-molded shell.

3. The pet bed of claim 1, wherein said flexible material comprises a mesh material capable of permitting air circulation into and out of said pet bed.

4. The pet bed of claim 1, wherein said upper frame members number four.

5. The pet bed of claim 4, wherein said four upper frame members are grouped in pairs and said pairs of upper frame members can be moved towards the lower frame member in opposite directions.

6. The pet bed of claim 1, wherein each upper frame member attaches to said lower frame member independently of each other.

7. The pet bed of claim 1, wherein two or more of said upper frame members attach to said lower frame member at the same attachment point.

8. The pet bed of claim 1, wherein said top unit additionally comprises a handle.

9. The pet bed of claim 1, wherein said handle can be positioned to prevent said top unit from fully opening thereby creating an opening for animal ingress and egress.

10. The pet bed of claim 1, wherein said bottom unit is reversibly attached to said top unit by one or more attachment means selected from a group consisting of zippers, buttons, clasps, snaps, hook and loop fastener, laces, hooks and straps.

11. The pet bed of claim 1, wherein said bed bottom is reversibly attached to said top unit by one or more zippers.

12. The pet bed of claim 1, wherein said upper frame members and flexible material of said top unit can be inverted into said bottom unit.

13. The pet bed of claim 1, wherein said pet bed also comprises one or more loops for insertion of a vehicle seat belt.

14. The pet bed of claim 1, wherein said flexible material of said top unit additionally comprises a flap suitable for animal ingress and egress.

15. The pet bed of claim 1, wherein said top unit additionally comprises a sliding door.

16. The pet bed of claim 1, wherein said lower frame member is comprised of one or more pieces.

* * * * *